2,695,897

TALL OIL ESTERS WITH MONOHYDRIC PHENOLS

Maxwell A. Pollack, Morris Plains, N. J.

No Drawing. Application July 21, 1951,
Serial No. 238,023

3 Claims. (Cl. 260—27)

This invention relates to esters of monohydric phenols with tall oil and is a continuation in part of my application Serial No. 8,282, filed February 13, 1948, for Plastic Composition, issued as Patent 2,563,485 on August 7, 1951.

The said application relates to vinyl chloride resin plasticized with esters of organic acids with monohydric phenols.

I have now discovered special advantages in the esters of a monohydric phenol with tall oil, particularly for use as a modifier for vinyl resins and as an ingredient of rubber compositions.

Briefly stated, my invention comprises the esters of tall oil with the monohydric phenols from which there has been separated a part, the removal of which minimizes or prevents entirely the usual slow exudation of plasticizer from a plasticized resin film.

As to materials, the tall oil used is ordinarily in refined condition. Crude tall oil also may serve as the source of mixed acids since the esters produced may be and suitably are refined as the final step in their manufacture.

The phenol used is ordinarily phenol itself, that is, mono-hydroxy benzene. Other phenols that may be used are o-, m-, and p-cresol, p-tertiarybutyl phenol, p-chlorophenol, the dichlorophenols, alpha-naphthol, beta-naphthol, methyl ether of hydroquinone, nonylphenol, and isopropylphenol.

As to proportions, the modifier may be used in amount varying with the effect desired. In general, when used for stabilizing effect, the proportions may range from one to twenty parts per 100 parts of modified resin or rubber. As a plasticizer, the proportions will generally range from about 5 to 100 parts per 100 parts of resin or rubber used as the plastic base material.

Conditions of manufacture of plastics according to the invention are conventional except for the replacement of previously used modifiers by the modifier and except as specifically stated herein.

The modifiers are useful with a wide variety of resins, including vinyl chloride resins, these vinyl chloride resins including polyvinyl chloride and copolymers of vinyl chloride with other vinyl monomers, vinyl acetal resins, acrylate and methacrylate resins, polystyrene, butadiene-styrene copolymers, butadiene-acrylonitrile copolymers, natural rubber, vinylidene chloride, nitrocellulose, cellulose propionate, cellulose acetatebutyrate, benzyl cellulose, urea-formaldehyde, melamine-formaldehyde, and alkyd resins such as glyceryl phthalate. The term polyvinyl resin is used herein to mean resinous materials resulting from polymerization involving the vinyl group $CH_2=C=$ which occurs in all vinyl monomers and which is the unit responsible for the polymerization to the resinous polymers.

The modifiers may be used alone, as the only plasticizer in any particular plastic composition, or they may be mixed with each other or with other plasticizers and modifying ingredients, such as dioctyl sebacate, dibutyl sebacate, dibutyl phthalate, triethylene glycol dihexoate, dibutoxyethyl phthalate, dibutyl cellulose adipate, chlorinated aromatics, nitrodiphenyl, camphor, dimethyl phthalate, propylene glycol sebacate, triglycol dicaprylate and the like.

The modifiers may be used as stabilizers either alone or mixed with other stabilizers that are conventional for use with the particular plastic or resinous base material as, for instance, with dibenzyl ether, phenyl propylene oxide, barium ricinoleate, lead phosphite, dibutyl tin dilaurate, and cadmium octoate.

The invention will be further illustrated by the following specific examples of the practice of it.

In these examples and elsewhere herein the proportions are expressed as parts by weight except as specifically stated to the contrary.

Example 1

Three hundred and thirty-seven parts of refined tall oil was converted into the acid chloride by reaction with phosphorus trichloride. When this was heated with phenol, hydrogen chloride was evolved, and the phenyl ester of tall oil was produced. Traces of unreacted materials were removed by washing with dilute alkali, then with water. After drying and filtering, the ester appeared as a clear, light yellow liquid. This ester was subjected to distillation conditions under an absolute pressure of 2 mm. of mercury. By this procedure, the product was separated into three portions. The first (A) was the forerun (7%) distilling up to 220° C., the second (B) was the major distillate (76%) distilling between 220 and 260° C., while (C) the third (17%) was the residue left after distillation, which showed no sign of decomposition due to this treatment. All three were clear oils, with the viscosity increasing from A to B to C.

All three were compounded with polyvinyl chloride resin, giving homogeneous plastic films, containing in each case 60 parts of ester for 100 parts of resin. However, it was noted that the film made with A showed a rapid exudation of clear oil on the surface of the film, while the films made with B and C remained dry. Compatibility tests showed that the removal of A greatly improved the compatibility of the remainder in vinyl chloride plastics. Fractions B and C, as compared to the ester of the whole tall oil, showed greatly improved resistance to migration into nitrocellulose films in contact with the film containing the said fractions.

Example 2

The procedure of Example 1 is followed with the substitution, on an equimolecular basis, of any of the phenols listed above for the phenol of Example 1. The resulting ester is washed with dilute alkali solution and then with water. The washed material may be passed through a tower of decolorizing carbon, to lighten the color of the ester. The ester is then subjected to vacuum fractionation at an absolute pressure of approximately 2 mm. of mercury. The foreshot is removed and the receiver changed when the bulk of the esters begin to distill over. This larger fraction is the one used. It contains my desired esters free from the foreshot portion.

The amount of the foreshot to be separated varies with the efficiency of the fractionation. The more efficient the fractionation, the smaller is the proportion of the foreshot material that must be separated. With the most efficient fractionation in vacuo that is feasible in the laboratory, I separate as a foreshot 3% to 5% of total product whereas with less efficient fractionation the amount to be set aside reaches 10% to 25%, in removing material boiling up to 220° C. at 2 mm.

The fraction above this foreshot gives, with the vinyl resins, plasticized films from which exudation of plasticizer is negligible. Without the separation of the foreshot, on the other hand, an exudate may appear on plastic compositions containing high proportions of these esters, particularly on long standing.

Example 3

Fifty-five parts of the product of Example 1 was mixed with 100 parts of a commercial polymer VYNW (copolymer of vinyl chloride with a minor percentage of vinyl acetate) and 2 parts of Plumb-O-Sil B (lead silicate and silica gel complex). This mixture was milled on a two roll mill at 280° F., whereupon fusion occurred rapidly to form a coherent sheet. This was blended thoroughly on the mill for 10 minutes and removed.

Example 4

An elastomer was made of the following formula and cured for 30 minutes at 310° F.

| | Parts |
|---|---|
| Hycar OR–25 (butadiene-acrylonitrile copolymer) | 100 |
| Zinc oxide | 5 |
| Stearic acid | 1 |
| Sulfur | 1.5 |
| Carbon black (Furnex) | 60 |
| My ester of Example 1 or 2 | 30 |
| Altax (benzothiazyl disulfide) | 1.5 |

The plastic made as described showed good physical properties for use as a synthetic rubber.

In general, the ester fractions described herein are stable at high temperatures which are considerably above those at which many esters are known to decompose. Thus, I have distilled the esters at temperatures as high as 280° C. in vacuo with no evident decomposition. The esters are substantially non-volatile under conditions of use. Finally, my esters are practically non-migratory in a film plasticized with them.

It will be understood that it is intended to cover all changes and modifications of the examples of the invention herein chosen for the purpose of illustration which do not constitute departures from the spirit and scope of the invention.

What I claim is:

1. A resin composition comprising a vinyl chloride resin and a fraction of the esters of tall oil with a monohydric phenol, the said fraction being substantially free of material distilling up to 220° C. at 2 mm. of mercury pressure, containing all of the tall oil and monohydric phenol esters boiling above 220° C. at 2 mm., and serving as plasticizer for the vinyl chloride resin and giving a composition characterized by freedom from exudation of plasticizer on standing.

2. The resin composition of claim 1 in which the monohydric phenol is phenol.

3. The resin composition of claim 1 in which the monohydric phenol is cresol.

References Cited in the file of this patent

UNITED STATES PATENTS

| Number | Name | Date |
|---|---|---|
| 2,563,485 | Pollack | Aug. 7, 1951 |

OTHER REFERENCES

Harber et al.: Ind. and Eng. Chem., vol. 37, October 1945, pages 953–956.

Beilstein, vol. 6, 1931 edition, page 87.